(No Model.)
E. SENN.
SAW SET.
No. 246,980. Patented Sept. 13, 1881.
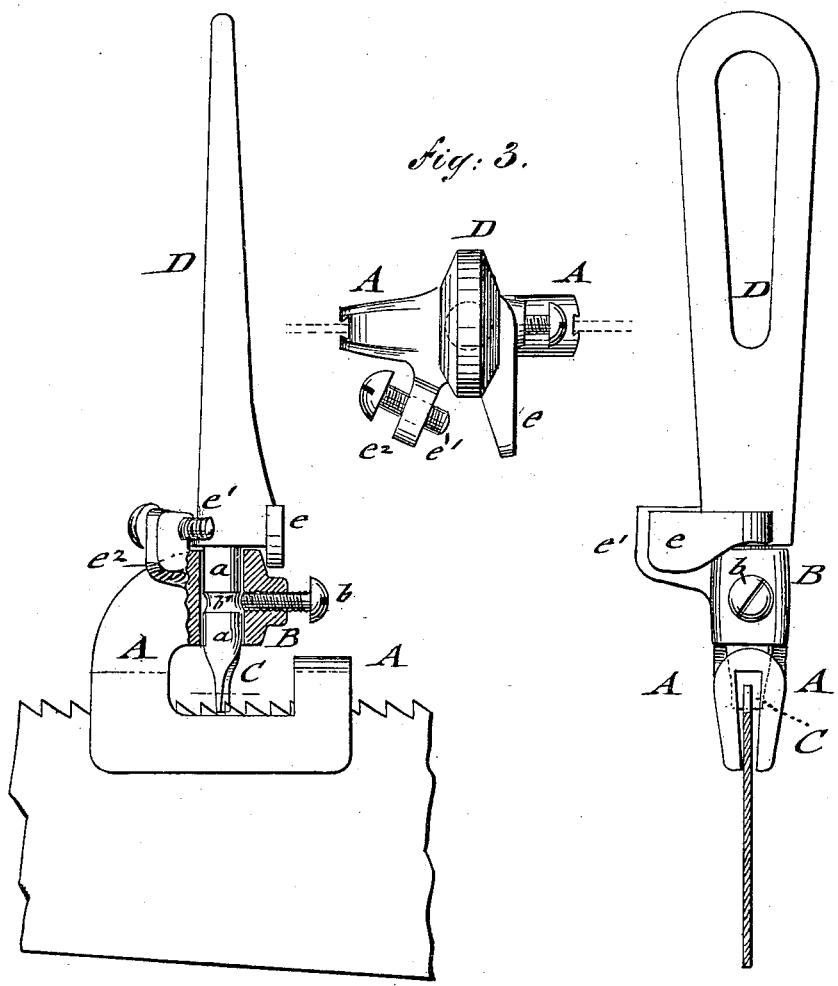
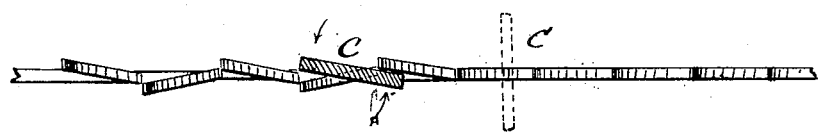
WITNESSES:
Carl Kass
Otto Risch
INVENTOR
Eduard Senn
BY Paul Goepel
ATTORNEY

UNITED STATES PATENT OFFICE.

EDUARD SENN, OF NEW YORK, N. Y.

SAW-SET.

SPECIFICATION forming part of Letters Patent No. 246,980, dated September 13, 1881.

Application filed November 18, 1880. (No model.)

*To all whom it may concern:*

Be it known that I, EDUARD SENN, of the city, county, and State of New York, have invented certain new and useful Improvements in Saw-Sets, of which the following is a specification.

This invention relates to a simple device for setting the teeth of common saws; and it consists of a U-shaped holder or yoke, which is applied to the saw-blade and provided with an axially-movable setting-plate and handle, the latter being provided with a fixed stop, which abuts against an adjustable set-screw of the holder, so as to control the degree of set of the saw-teeth as imparted by the setting-plate of the handle.

In the accompanying drawings, Figure 1 represents a side elevation, partly in section, of my improved saw-set. Fig. 2 is an end view; Fig. 3, a top view of the same, and Fig. 4 an enlarged end view of the saw-blade, showing the relative positions of the setting-plate to the teeth of the saw-blade before and after setting.

Similar letters of reference indicate corresponding parts.

In the drawings, A represents the holder or yoke of my improved saw-set, which holder is made of U shape at the ends and with an open middle portion, so as to be placed in position on the saw-blade in such a manner that the teeth of the saw project above the middle portion, as shown in Fig. 1. One of the U-shaped end yokes is extended upwardly and inwardly and provided with a sleeve, B, which is cast in one piece with the holder A. In the sleeve B is guided the shank $a$ of a setting-plate, C, which is provided with a handle, D. The shank $a$ is retained by means of a set-screw, $b$, which enters into an annular groove, $b'$, of the shank.

The setting-plate C may be removed by unscrewing the set-screw $b$, which, when screwed forward so as to enter into the groove $b'$, permits the axial motion of the setting-plate C, but prevents its withdrawal from the sleeve B.

The handle D is provided with a fixed stop, $e$, which forms contact with an adjustable set-screw, $e'$, of a projecting ear or lug, $e^2$, of the sleeve of the holder when the handle and shank are turned around its axis.

The device is employed in setting the teeth of the saw in the following manner: The holder is placed in position on the saw-blade and the setting-plate inserted at right angles to the blade in the space between two adjoining teeth, as shown in dotted lines in Fig. 4. The handle is then turned and the setting-plate brought to bear upon two adjoining teeth of the saw-blade, which are thereby set in opposite direction to each other, but each at the same angle of inclination to the blade. (See Fig. 4.)

The saw-teeth may be set to a greater or less degree of inclination by increasing or decreasing the extent of axial motion of the setting-plate, which is governed by the adjustable contact-screw $e'$. This device is then moved on between the next two teeth, and so on, until all the teeth of the saw are set, two teeth being always set in opposite directions and at the same time.

Having thus described my invention, I claim as new and desire to secure by Letters Patent—

1. In a saw-set, the combination of a U-shaped holder or yoke adapted to receive the saw-blade, a setting-plate the shank of which has its bearings in said holder, said plate being adjustable transversely between two adjoining saw-teeth and being movable axially of its shank, whereby a uniform bending of said teeth in opposite directions is effected, and means for limiting the extent of axial motion of the setting-plate, substantially as described.

2. The combination of a holder or yoke A, provided with guide-sleeve B, lug $e^2$, and contact-screw $e'$, a setting-plate adjustable between two adjoining saw-teeth transversely of the blade and movable axially of its shank, which is held within said sleeve, a handle, D, and a projecting stop, $e$, substantially as described.

In testimony that I claim the foregoing as my invention I have signed my name, in presence of two witnesses, this 1st day of November, 1880.

EDUARD SENN.

Witnesses:
PAUL GOEPEL,
CARL KARP.